Aug. 29, 1972  R. G. E. VANDEWYER  3,687,727
IMPROVEMENTS RELATING TO THE TREATMENT
OF SUGAR FACTORY MOLASSES
Filed July 2, 1970  3 Sheets-Sheet 1

ROMAIN GUSTAVE EDGARD VANDEWYER,
Inventor

By, *Wendorth, Lind & Ponack*
Attorneys

United States Patent Office 3,687,727
Patented Aug. 29, 1972

3,687,727
IMPROVEMENTS RELATING TO THE TREATMENT OF SUGAR FACTORY MOLASSES
Romain Gustave Edgard Vandewyer, Vissenaken, Belgium, assignor to Raffinerie tirlemontoise, Brussels, Belgium
Filed July 2, 1970, Ser. No. 51,865
Claims priority, application Belgium, July 8, 1969, 735,802; June 24, 1970, 752,442
Int. Cl. C13j 1/04
U.S. Cl. 127—47        7 Claims

ABSTRACT OF THE DISCLOSURE

The process for precipitating a saccharose-lime combination from sugar factory molasses by adding lime to molasses under cold conditions is improved by recycling several volumes of lime treated molasses prior to the separation of the saccharose-lime combination with one volume of untreated diluted molasses. The recycled mixture of lime treated and untreated dilute molasses is passed countercurrent to the direction of lime addition so that the recycled mixture encounters an increasing alkaline gradient. The benefits of this process include improved filterability of the lime-saccharose combination as well as improved stability of this combination.

This invention relates to improvements in the treatment of sugar-mill molasses and more particularly to the recovery of saccharose from said molasses.

It is known to recover the saccharose contained in molasses by the so-called Steffen's process. Three stages may be noted in said process:

1st stage

The molasses is diluted with water to obtain a solution containing about 6% saccharose. Said diluted molasses may possibly be cooled below 15° C.

2nd stage or cool precipitation stage

The diluted molasses containing 6% saccharose is fed to an open tank which is provided with a stirrer and which comprises cooling means to maintain the mixture temperature below 15° C. While stirring well, finely-powdered quicklime is added. There occurs a precipitation of a saccharose-lime combination which is then filtered out.

3rd stage or hot precipitation stage

The filtrate from the preceding stage is heated to 85° C., which results in precipitating a further amount of saccharose-lime combination. The precipitate is filtered out and the mother liquor is discharged as waste water.

The saccharose-lime combination from the 2nd and 3rd stages may be added after washing, to the crude beet juice and in such a case it is used as a defectant, or else it may be suspended in water and decomposed by carbonating to release the saccharose.

This process has however the drawback of being discontinuous. At present, it is desired to make the operations continuous. It has alreaady been proposed to have a continuous cool precipitation but in all the processes up to now, said precipitation requires intricate equipment and the results are not to be compared with the results according to this invention.

On the other hand the Steffen's process is very difficult to perform. It is necessary to adhere very strictly to the directions regarding the molasses dilution, the quality and amount of quicklime added, the temperature at which the reaction occurs. Thus it is not suitable to exceed 6% saccharose as this lowers the output of said saccharose-lime combination and causes substantial filteration problems. It is better to work on solutions containing less than 6% saccharose. However under such conditions, the higher the dilution the less economical becomes the Steffen's process; it is indeed necessary both to increase the capacity of the tank inside which the cool precipitation occurs and the filtering apparatus capacity.

It is also advantageous to distribute the quicklime into the largest possible volume, a higher dilution of said reactant being an aid to the precipitation.

Finally there should also be noted that the saccharose-lime combination from the Steffen's process is rather unstable as it decomposes rather fast and saccharose is then released.

The present invention brings improvements to the second stage or cool precipitation stage of the Steffen's process, notably by making said precipitation continuous. The invention has also for object to greatly increase the filterability of the saccharose-lime combination.

The advantages resulting from the invention are mainly as follows:

the cool precipitation occurs in solutions with low contents dissolved saccharose;
high regularity and good stability of the various steps of the cool precipitation;
a very large reduction of the required filtering area to insure the precipitate separation;
precipitate much easier to wash, thus more pure and consequently higher output of white sugar;
higher stability of the saccharose-lime combination;
possible to reduce of the amount of lime required to precipitate the saccharose;
possible to substitute a large portion with the quicklime, of lime milk;
possible to dilute the molasses with a large proportion of the filtrate from the cool precipitation and the precipitate washing water;
possible to use a less-finely comminuted lime.

To attain the above-mentioned objects and advantages, in this method according to the invention, diluted molasses is continuously mixed with already treated and recycled molasses, before adding lime. Said lime addition is made continuously by a process stage downstream from the point where the mixing of the diluted molasses with the recycled molasses occurs, the added lime being forced towards the point where said diluted molasses-recycled molasses mixing is made, so as to generate an alkalinity gradient which increases from the stage where the diluted molasses-recycled molasses mixing is made up to the stage where the lime addition is made.

In practice the molasses with 6% saccharose is diluted either with clear water or with a mixture of clear water and filtrate from the cool precipitation and/or precipitate washing water. One volume of said diluted molasses is then continuously mixed with 3 to 7 volumes, preferably 4 to 5 volumes of already treated and recycled molasses. After suitable mixing, 70 to 130 g. of lime, for example 100 to 130 g. are then continuously added to every 100 g. of worked saccharose, the lime being added either entirely as quicklime, or partly as lime milk and partly as quicklime, said lime addition being so made as to generate an alkalinity gradient which increases from the stage where the diluted molasses-recycled molasses mixing is made up to the stage where the lime addition is made.

The recycled treated molasses retain in suspension both the saccharosse-lime combination and the free lime and consequently said recycled treated molasses serves as a precipitating agent, the diluted molasses-recycled molasses mixture then traveling through an increasing alkalinity gradient.

With such an operating procedure, the saccharose precipitation begins in a medium with very low saccharose concentration and in the presence of already-precipitated saccharose-lime combination used as support for the fresh precipitate, and said precipitation proceeds in a medium with increasing alkalinity, which probably explains the better filterability and the higher stability of the resulting combination.

In practice, 60% of the water used for diluting the worked molasses may be replaced by filtrate from the cool precipitation and/or by precipitate washing water.

It is also possible to use without difficulties quicklime provided as coarsely-comminuted powder, for example a quicklime that would only comprise 70% particles passing through a screen with 74 μm-wide meshes.

The method according to the invention also enables to substitution lime milk for 50 to 60% of the quicklime; both of said additions may be made in different parts of the cycle.

The invention also relates to an installation for the working of the above-defined method, said installation comprising essentially a reaction tank which is provided with a stirrer, a re-circulating system for the treated molasses and cooling means.

The re-circulating system may be comprised of means providing an adjustable inner re-circulation and/or of means providing an outer re-circulation.

Other details and features of the invention will be apparent from the description given below by way of non-limitative example and with reference to the accompanying drawings, in which.

For working the invention there should essentially be provided, a tank with a stirrer and a re-circulating system, as well as with cooling means. The supply of the coolant required to balance the calories released by the reaction may be made by passing the molasses which have been treated and recycled, through a heat exchanger cut in the circuit.

Various changes are of course possible.

Figure 1:
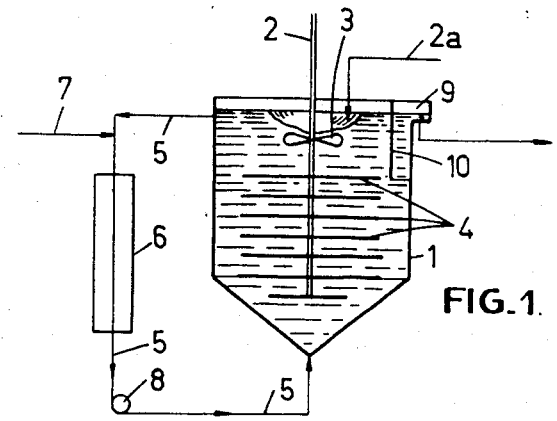
FIG. 1 is a diagrammatic elevation view, partly in section, of a first embodiment of a continuous cool precipitation installation according to the invention.
Figure 2:
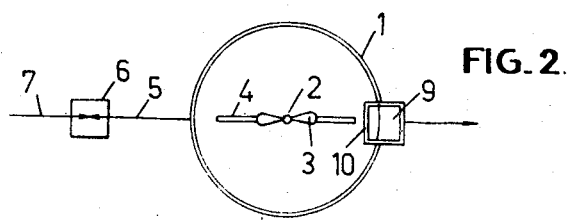
FIG. 2 is a plan view corresponding to FIG. 1.

According to a first embodiment, as shown in FIGS. 1 and 2, use is made of an open cylindrical tank 1, with a conical bottom. Said tank 1 is provided with a stirrer 2 which bears a screw 3 and stirring blades 4, and with a recycling piping 5 which comprises cooling means 6 and a pump 8. Inside the tank 1, a partition 10 which is attached or soldered to the tank wall, is bounded by an overflow compartment 9.

The molasses diluted to about 6% saccharose is fed continuously into the recycling pipe 5 through pipe 7 and is mixed therein continuously with already-treated molasses from the tank 1. The mixture passes through the cooling means 6 to lower the temperature thereof below 15° C. and it is then forced by the pump 8 into the conical bottom of the tank 1. The addition of lime 2a is made where the liquid taken along by the screw 3 forms a trough. The lime is forced by the screw 3 towards the bottom of the tank 1 and thus generates an alkalinity gradient which increases from the tank bottom up to the top thereof. A volume of treated molasses flows continuously over the overflow 9 to be fed to the filtering apparatus, while 3 to 7 volumes, preferably 4 to 5 volumes of treated molasses are recycled through the piping 5.

Figure 3:
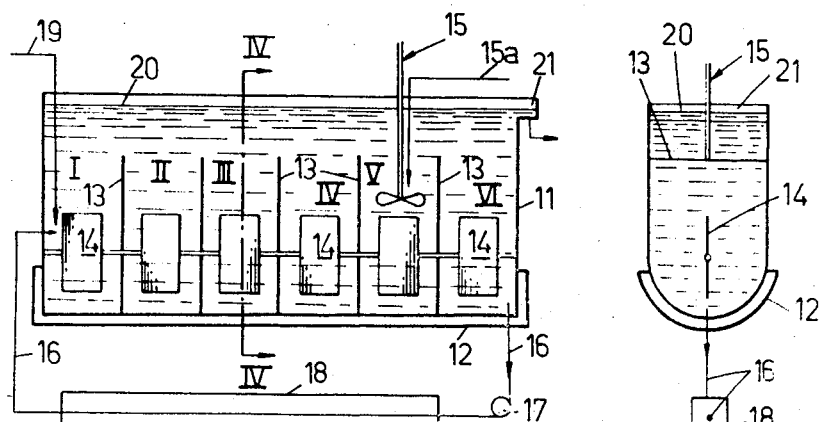
FIG. 3 is a diagrammatic elevation view, partly in section, of a second embodiment according to the invention.
Figure 4:
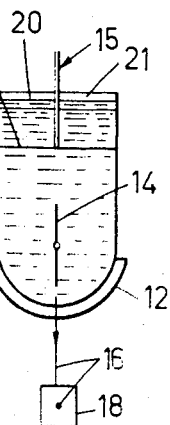
FIG. 4 is a side section view along line IV—IV in FIG. 3.

According to a second embodiment, use is made of an open horizontal tank 11 with semi-cylindrical bottom, as shown diagrammatically in FIGS. 3 and 4, said tank being optionally provided with a double jacket 12 through which cold brine may be circulated. The tank 11 is divided inside in compartments over part of the height thereof, by means of partitions 13. In FIG. 3 has been shown a tank with six compartments designated I, II, III, IV, V and VI each compartment being provided with a screw stirrer 15. From the bottom of the compartment VI leads a recycling piping 16 which opens in compartment I below the liquid level 20. In this piping 16 are cut in a pump 17 and cooling means 18.

By means of a piping 19, molasses diluted to 6% saccharose is continuously supplied to compartment I. Said piping 19 opens below the liquid level 20 inside the tank 11. Treated molasses is withdrawn from the bottom of compartment VI through the piping 16 and by means of the pump 17, it is forced through the cooling means 18 and therefrom in compartment I in the location where opens the piping 19 which supplies the molasses diluted to 6% saccharose.

The molasses diluted to 6% saccharose is mixed thoroughly with the recycled treated molasses and said mixture passes by overflowing, from compartment I to compartment II and so on. The lime is continuously added through a duct 15a in compartment V where it is thoroughly mixed with the liquid by means of the screw stirrer 15.

Due to the turbulence caused by the stirrers 14, part of the mixture from compartment V flows back to compartment IV and so on, which thus generates an alkalinity gradient which increases from compartment I to compartment V.

One volume of treated molasses flows continuously through the overflow 21 of compartment VI, while 3 to 7 volumes, preferably 4 to 5 volumes of treated molasses are recycled towards compartment I.

Figure 6:
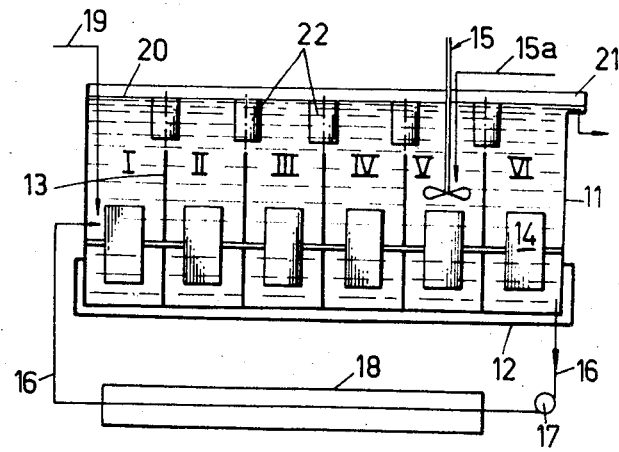
FIGS. 6 and 7 are elevation and plan views, respectively, of a third embodiment according to the invention.
Figure 7:
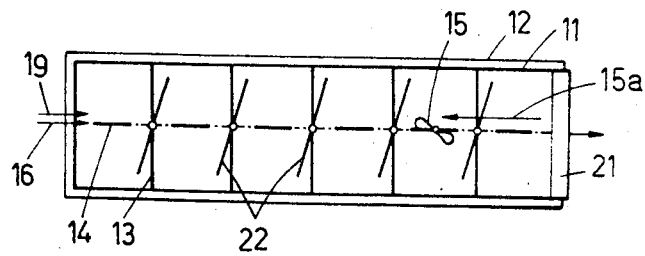

In a third embodiment, use is made of an apparatus with inner re-circulating of the type used usually in sugar-mills for the progressive pre-liming, that is an apparatus as shown in FIGS. 6 and 7. Said apparatus is moreover rather similar essentially to the apparatus shown in FIGS. 3 and 4 and the same reference numerals have been used for similar elements in FIGS. 6 and 7 and in FIGS. 3 and 4. However said apparatus of FIGS. 6 and 7 comprises a set of movable claps 22 or any other contrivance allowing to recycle part of the liquid from the last compartment VI toward the preceding compartment V and so on from back to front while simultaneously the inlet liquid flows from the front to the back of the apparatus where it is withdrawn. Along these lines, use may advantageously be made of a horizontal apparatus such as the Brieghel-Muller's pre-limer described in Belgian Patent 497,708 dated August 22, 1950. Said apparatus may advantageously replace the apparatus shown in FIGS. 3 and 4. As in this type of apparatus, the inner re-circulation may be adjusted at will, it is of course possible to do away with the outer circuit 16 for recycling the treated molasses by accepting a more complicated technical design of the Brieghel-Muller's apparatus due to the introducing therein of cooling surfaces large enough to get rid of the heat of reaction.

However it is advantageous to retain the inner and outer re-circulating as there is then a possibility of adjusting precisely the zone of varying alkalinity gradient while reducing at the same time the reaction tank volume.

The three embodiments described are of course only given by way of example and many changes may be provided therein.

To prove the benefit of the continuous method according to the invention, comparative test of molasses treatment have been made with the Steffen's discontinuous process on the one hand and the continuous process according to the invention in both installation embodiments as described above, on the other hand.

The conditions used in the test are given in Table 1 below.

TABLE 1

|  | Steffen | 1st emb. | 2nd emb. | Steffen | 2nd emb. |
|---|---|---|---|---|---|
| Treatment type | Discontiouous | Continuous | Continuous | Discontinuous | Continuous |
| Dilution of the worked molasses, percent. | ±6 | ±6 | ±6 | ±6 | ±6 |
| Volume of recycled treated molasses, percent. | 0 | 400–500 | 400–500 | 0 | 400–500 |
| CaO proportion added per 100 g. worked saccharose, g. | 130 | 130 | 130 | 70 | 70 |
| Filtering time for 500 cc., sec. | 30 | 10 | 9 | 117 | 16 |

Figure 5:
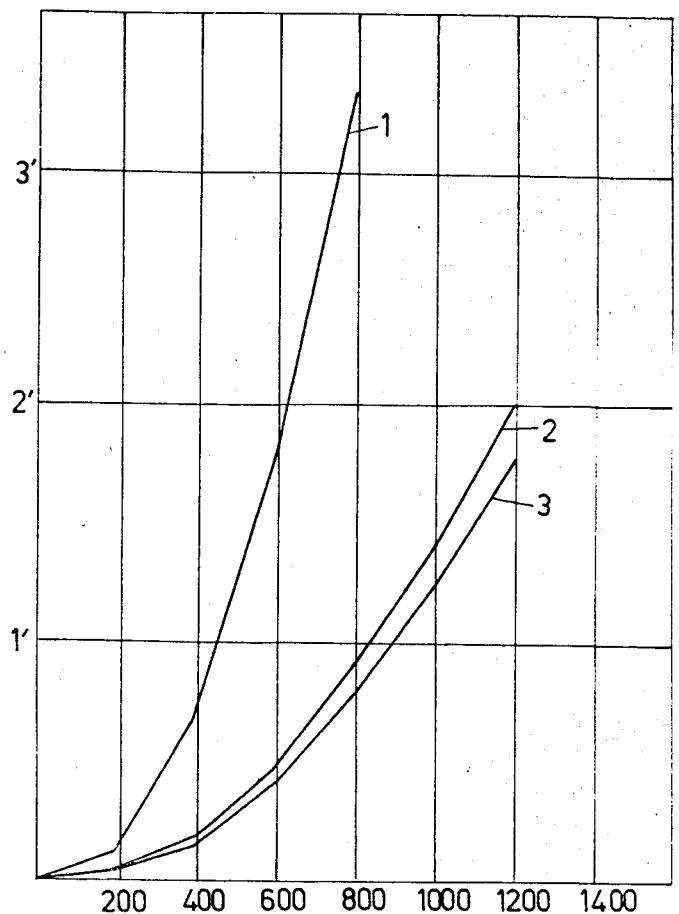
FIG. 5 shows by a diagram the results obtained according to the invention relative to the results obtained by means of the Steffen's process.

The filtering results are given in the Table 2 below and are illustrated by the curves in FIG. 5.

The filtering times have been determined on molasses which have been treated by filtering under a 600 mm. Hg depression over a Buchner with 1 dm.² filtering surface and provided with a Lainyl cloth. In FIG. 5 the filtering time in minutes is given in ordinates while the filtrate amount in cc. is given in abcissae. Curve 1 corresponds to Steffen's treatment, curve 2 to the continuous process in the first embodiment of the invention and curve 3 to to continuous process in the second embodiment.

TABLE 2

|  | Steffen | 1st embodiment | 2nd embodiment |
|---|---|---|---|
| Amount of filtrate, cc.: |  |  |  |
| 200, sec | 8 | 3 | 3 |
| 400, sec | 41 | 11 | 10 |
| 600, sec | 105 | 28 | 25 |
| 800, sec | 198 | 54 | 47 |
| 1,000, sec |  | 84 | 74 |
| 1,100, sec |  | 101 | 89 |
| 1,200, sec |  | 120 | 106 |
| Saccharose remaining in solution, g. for 100 cc. | ±0.4 | ±0.4 | ±0.4 |
| Stability of the saccharose-lime combination: |  |  |  |
| Polarizing after rest of (min.): |  |  |  |
| 0 | .31 | .36 | .36 |
| 15 | .36 | .36 | .36 |
| 30 | .42 | .36 | .36 |
| 45 | .47 | .36 | .36 |
| 60 | .52 | .36 | .36 |
| Apparent purity of the saccharose-lime conbination. |  | (¹) | (¹) |

¹ Plus 1 point relative to discontinuous process.

To determine the above stability of the saccharose-lime combination, the procedure is as follows: at the outlet from the cool precipitation installation is taken a certain amount of treated molasses. A first aliquot part thereof is immediately subjected to filtering and the remaining saccharose in the filtrate is determined. The same procedure is followed with another aliquot part after waiting for 15 minutes. Then in the same way after 30, 45 and 60 minutes.

As for the purity of the saccharose-lime combination, it has been obtained as follows: the saccharose-lime combination from filtering is suspended in distilled water with a proportion of 100 g. saccharose-lime combination for 100 g. distilled water. The whole mixture is then heated to 85° C. and treated with carbonic gas up to neutrality to phenolphthalein. The product is filtered to remove the formed $CaCO_3$ and the saccharose is determined on the filtrate by polarizing and the dry substances by refractometry.

$$\text{Apparent purity} = \frac{\text{saccharose}}{\text{dry subst.}} \times 100$$

I claim:

1. In a method for treating sugar-factory molasses comprising cold precipitating a saccharose-lime combination by adding lime to diluted molasses under cold conditions and filtering the treated molasses to recover the saccharose-lime combination, the improvement which comprises recycling several volumes of the treated molasses prior to the separation of the saccharose-lime combination and mixing said volumes with one volume of untreated diluted molasses before recycling the mixture to the point at which the lime is added.

2. A method according to claim 1, wherein there is recycled 3 to 7 volumes of treated molasses per one volume of untreated diluted molasses.

3. A method according to claim 1, wherein there is recycled 4 to 5 volumes of treated molasses per one volume of untreated diluted molasses.

4. A method according to claim 1 wherein the diluent consists essentially of water.

5. A method according to claim 1 wherein there is continuously recycled several volumes of the treated molasses which is mixed with one volume of the untreated diluted molasses, while continuously adding lime downstream of the point where said diluted molasses-recycled molasses mixing occurs, so as to generate an alkalinity gradient which increases from the point where the diluted molasses-recycled molasses mixing is made up to the point where the lime addition is made.

6. A method according to claim 5 wherein there is 3 to 7 volumes of treated molasses per one volume of untreated diluted molasses.

7. A method according to claim 5 wherein there is recycled 4 to 5 volumes of treated molasses per one volume of the untreated diluted molasses.

References Cited

UNITED STATES PATENTS

| 1,878,145 | 9/1932 | Holven | 127—47 |
| 2,016,609 | 10/1935 | Meredith | 127—47 |

FOREIGN PATENTS

| 255,175 | 7/1926 | Great Britain | 127—47 |

OTHER REFERENCES

R. A. McGinnis, ed.: "Beet-Sugar Technology," 43&–52, Reinhold, New York, 1951.

MORRIS O. WOLK, Primary Examiner

S. MARANTZ, Assistant Examiner

U.S. Cl. X.R.

127—9